United States Patent [19]
Strecke

[11] 3,786,235
[45] Jan. 15, 1974

[54] PROGRAM READING MECHANISM

[76] Inventor: Heinz Strecke, Lindenbaumstrasse 13, 565 Solingen, Germany

[22] Filed: July 6, 1971

[21] Appl. No.: 160,052

[52] U.S. Cl. ............ 235/61.11 A, 178/17 B, 200/46
[51] Int. Cl.... G06k 7/06, H04k 15/18, H01h 43/08
[58] Field of Search .............. 235/61.11 R, 61.11 A, 235/61.11 C; 200/46; 178/17 B

[56] References Cited
UNITED STATES PATENTS

| | | | |
|---|---|---|---|
| 2,720,164 | 10/1955 | Braun et al. | 235/61.11 B |
| 2,781,973 | 2/1957 | Baer et al. | 235/61.11 C |
| 2,965,727 | 12/1960 | Passman | 200/46 |
| 3,159,733 | 12/1964 | Parstorfer | 200/46 |

Primary Examiner—Daryl W. Cook
Attorney—Holman & Stern

[57] ABSTRACT

A program reading mechanism in which a band shaped exchangeable program carrier is moved in increments by a transportation roll, with the data carried by the program carrier being scanned by contacts, and the transportation roll being driven by two flights connected to one another rotating about a common center and arranged diametrically in relationship to the common center, the flights engaging in radial slots provided for the periphery of a slotted disc connected to the transportation roll, with the common center of the flights being generally disposed at the level of the periphery of the slotted disc.

15 Claims, 5 Drawing Figures

PROGRAM READING MECHANISM

BACKGROUND OF THE INVENTION

This invention relates to a program reading mechanism including a bandshaped exchangeable program carrier moved by increments by a transportation roll, wherein the data carried by the program carrier are scanned by contacts (Such a mechanism is known from the German patent specification 1,186,536).

Such program reading mechanisms are used for controlling machines and next to a long life and a simple handling they are to be suited well both for a continuous and intermittent operation. The program carrier is to be moved by increments in order to provide for a reliable contactability and in order to be able to store a greater data capacity on the program.

PRIOR ART

For fulfilling these requirements, program reading mechanisms are known for the drive of which a Maltese-cross is used. Maltese-cross transmissions stress the program carrier as a result of the movement by jerks or jolts, as they do other parts of the apparatus, and they themselves wear quickly. A Maltese-cross transmission is known from the British patent specification 832,717.

Furthermore, the Maltese-cross transmission has an extended idle period related to the drive period. In case of a four-slot Maltese cross, the impeller driving the Maltese cross rotates by 90° for the drive and by 270° for idle. Such an extended idle period requires a high drive speed and thereby renders difficult a quick and precise stopping of the drive motor, as this is required for an intermittent operation.

objects AND SUMMARY OF THE INVENTION

The problem which the invention is to solve is to provide a program reading mechanism which scans the data contained on the program carrier with particular reliability and has a slight wear rate.

According to the invention, this problem is solved by the measures that for the drive of the transportation roll, two flights are provided connected to one another, rotating about a common center and arranged diametrically in relationship to their common center, with said flights engaging in radial slots provided peripherally for a slotted disc connected to the transportation roll, and that the common center of the flights is generally disposed at the level of the periphery of the slotted disc.

Hence, a sinusoidal motion of the program carrier is obtained, i.e. a harmonic increment motion is provided for without any jolting movements which permits reliable contactabilities. The program carrier reused again and again and thereby subjected to heavy wear as well as other machine parts are protected. The motor and the transmission operate with low speeds, since there are no idle periods. Thus, it is possible to stop the program carrier quickly and precisely.

An embodiment of the invention has been illustrated in the drawings and will be described in closer detail herinafter. In the drawings:

DETAILED DESCRIPTION OF THE INVENTION

Figure 1:
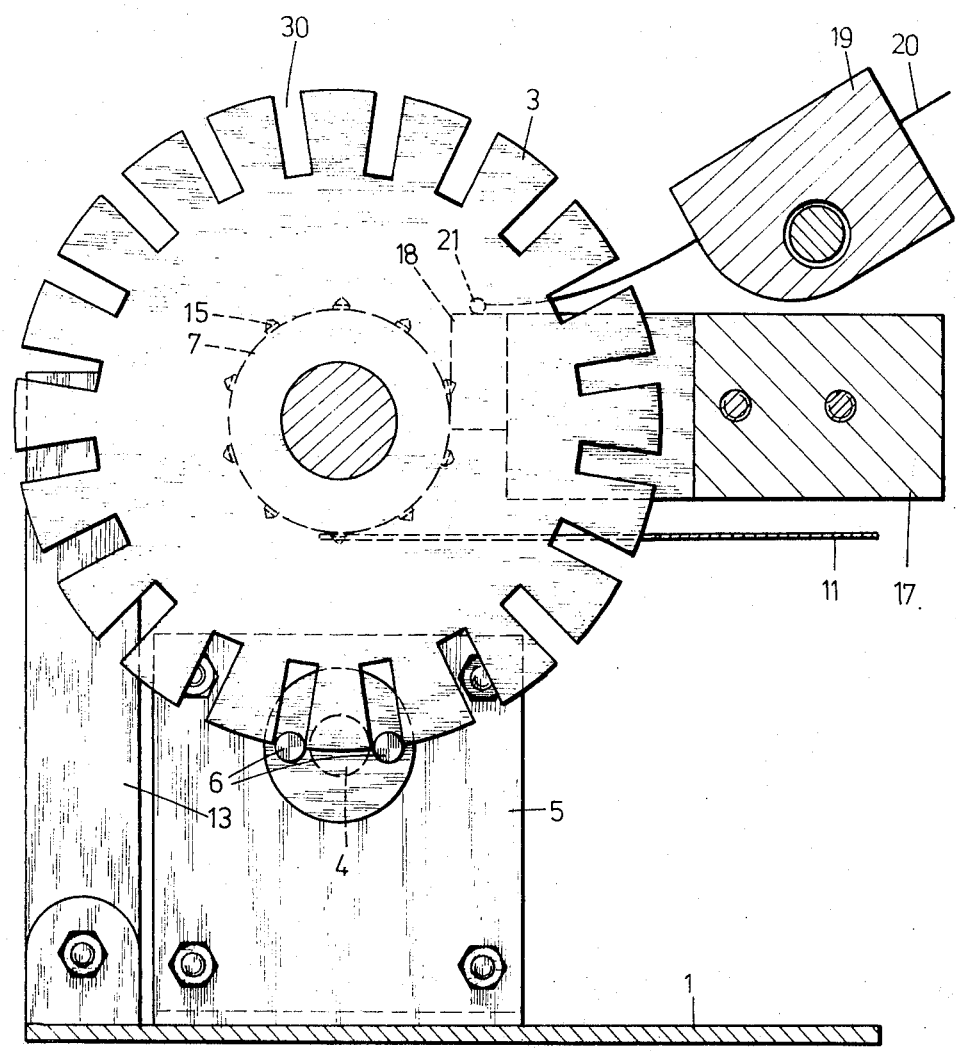
FIG. 1 is a sectional view of the program reading mechanism.
Figure 2:
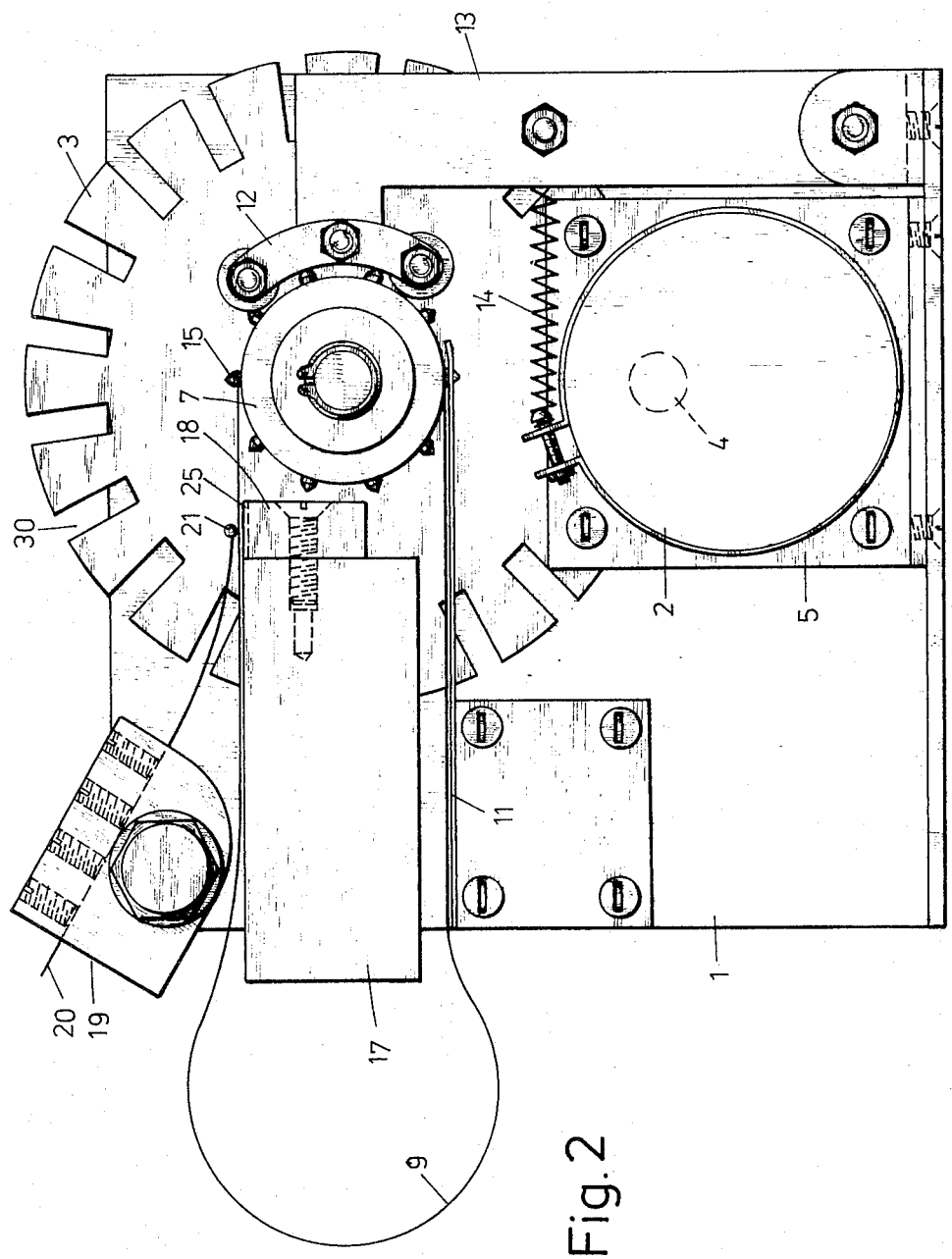
FIG. 2 is a side elevational view of the program reading mechanism.
Figure 3:
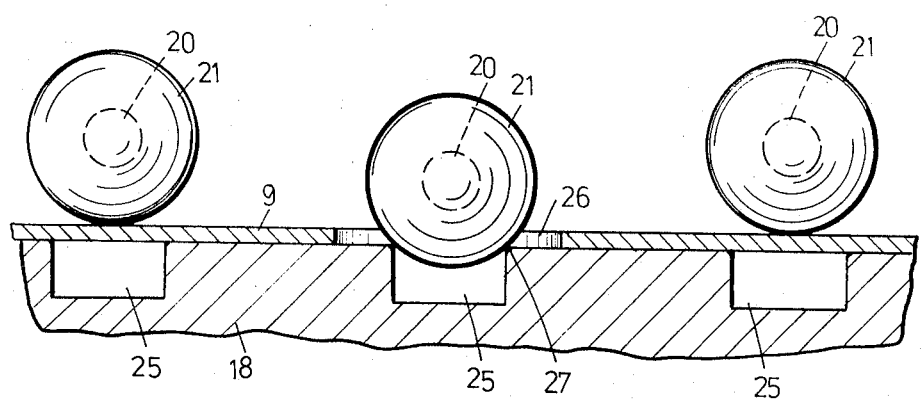
FIG. 3 is an enlarged view of the contact system and of the apertured film in cross-section.
Figure 3:
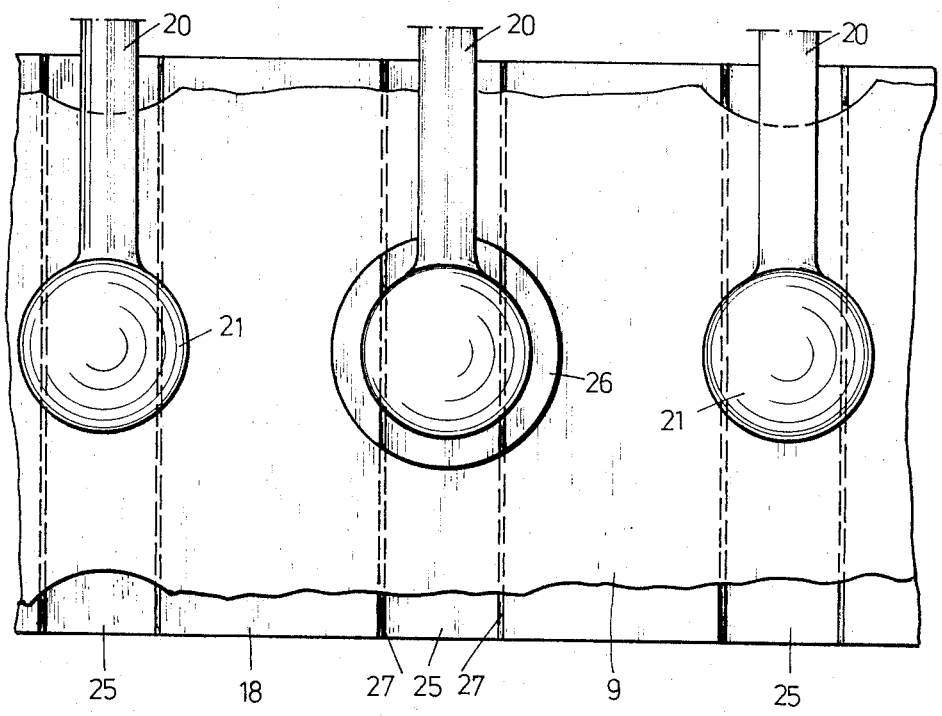
Figure 4:
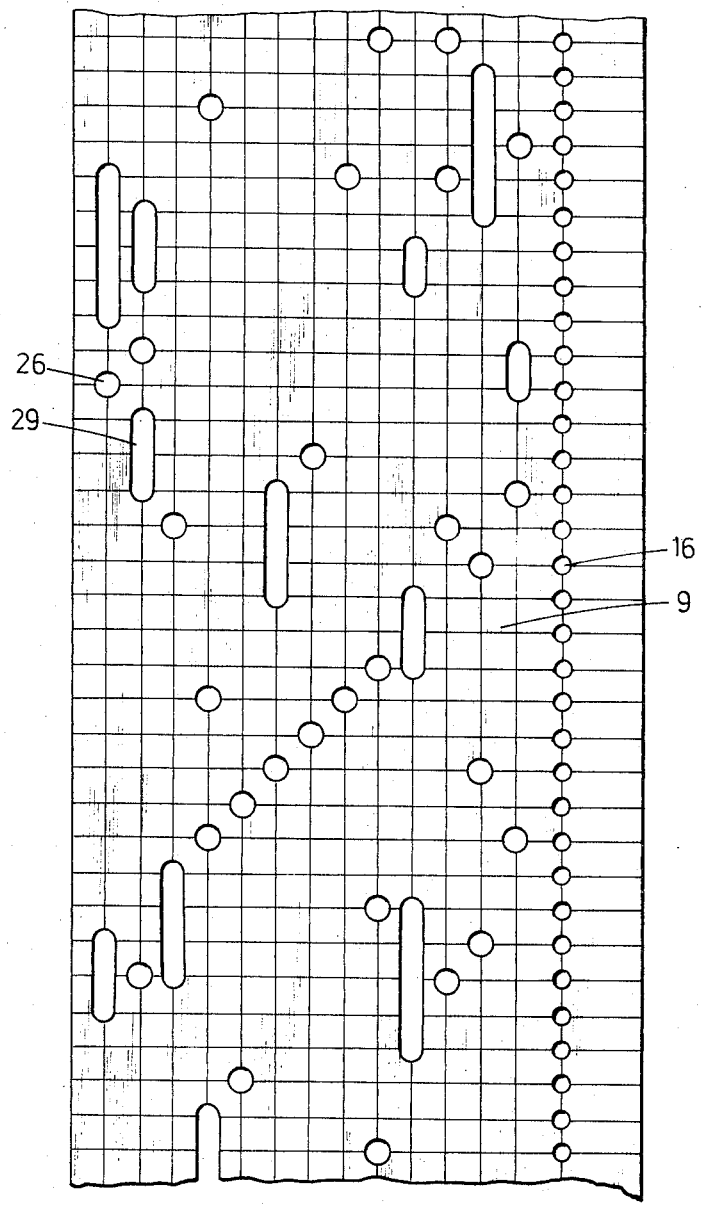
FIG. 4 is a view of the apertured film.

The program reading mechanism includes a frame 1 and a transmission motor 2 secured by an attachment bracket 5. A round disc is attached to output shaft 4 of the transmission motor 2, at which two flights 6 are arranged diametrically in the same spacing from the axis of the output shaft 4. The flights 6 engage in slots 30 provided for the periphery of a slotted disc 3, the axis of the output shaft 4 being positioned generally at the level of the periphery of the disc 3. A transportation roll 7 provided with pins 15 is secured to the disc 3, with said transportation roll moving an apertured film 9 of plastic, the pins engaging perforations 16 of the apertured film 9. Rotatably supported guide rolls 12 urged against the transportation roll 7 by a retaining bracket 13 and a tension spring 14 guide the apertured film 9 around the transportation roll 7. Furthermore, the apertured film 9 is guided over a guide sheet 11 positioned underneath the transportation roll 7, over an insulating block 17 positioned at the level of the transportation roll 7, and over a contact rail 18 secured to the insulating block 17.

The contact rail 18 is engaged by spherical contacts 21 secured to contact springs 20, which contacts touch the contact rail 18 through holes 26 or longitudinal recesses 29 of the apertured film 9. In the contact rail 18, grooves 25 thereof are associated with the spherical contacts 21, said grooves extending in direction of movement of the apertured film. The width of the grooves 25 is such that the spherical contacts 21 have two points of engagement 27 with the grooves 25.

The contact springs 20 are secured to a rotatably mounted arrestable insulating member 19.

The apertured film 9 has a coordinate system so that it can be noted in which line and in which channel the recesses 26 and 29 for the program are positioned.

Figure 5:
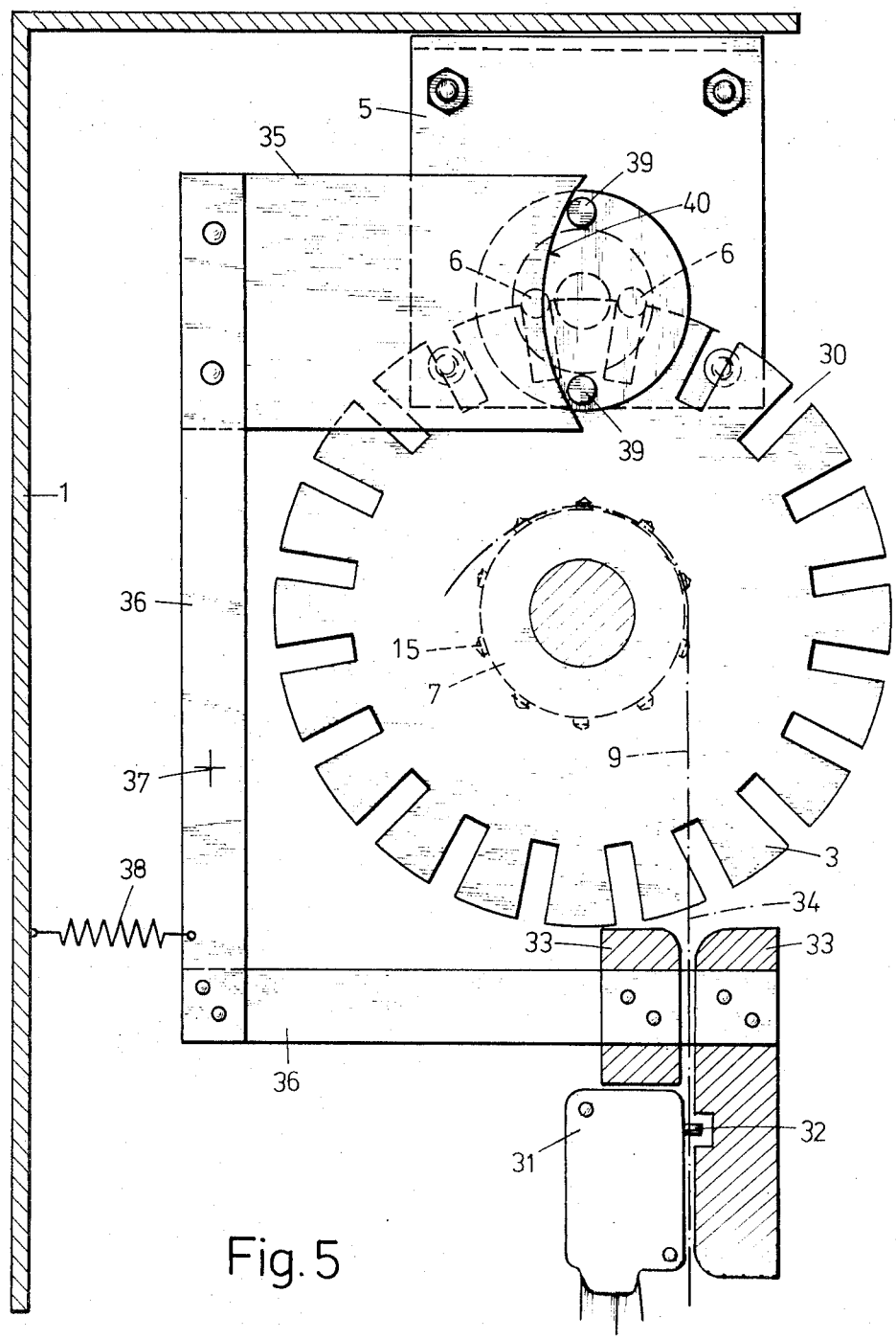
FIG. 5 is a sectional view of an alternative embodiment of the program reading mechanism.

In an alternative embodiment (FIG. 5), the apertured film 9 is scanned by contacts in the form of scanning pins 32 of a plurality of juxtaposed microswitches 31, with the apertured film 9 being guided in a slot 34 of a guide arrangement 33. The slot 34 is arranged perpendicular relative to the direction of movement of the guide arrangement 33. The guide arrangement 33 is moved by a lifting system defined by components 35 to 38 in such a way that the apertured film 9 is lifted off the scanning pins 32 before the apertured film is moved through the transportation roll 7.

The movement of the guide arrangement 33 is effected by a rectangular lever 36 secured to the guide arrangement, with said lever being supported rotatable about an axis 37 and carrying a cam portion 35 at its upper end, and said cam portion is urged with its engaging surface 40 by a spring 38 against a second rotating flight pair 39 of the disc. Since in this embodiment, the movement of the cam portion 35 is generally tangential relative to the slotted disc 3, the second flight pair 39 is arranged perpendicular relative to the first flight pair 6, so that the apertured film engages the microswitches 31 the moment the slotted disc stops. This moment has been illustrated in the drawing.

In the embodiment, the engaging surface 40 of the cam portion 35 has a concave shape, but by exchanging the cam portion 35, engaging surfaces of different shapes can be used also, whereby the type of movement of the guide arrangement 33 is variable as desired.

Alternatively, it is also possible that only one flight pair 6 is provided and that both the cam portion 35 and the slotted disc 3 are moved by this flight pair. Furthermore, it is possible that the lever 36 does not lift off the guide arrangement 33 and thus the apertured film 9 from the microswitch 31, but the microswitch 31 or the scanning pin 32 from the apertured film 9.

I claim:

1. A program reading mechanism including a band-shaped exchangeable program carrier, a transportation roll by which the program carrier is moved in increments, contacts by which data carried by the program carrier is scanned, and a drive for the transportation roll, the drive comprising two flights connected to one another, means defining a common center about which the flights rotate, the flights being arranged diametrically in relationship to the common center, and a disc connected to the transportation roll, the disc having a periphery provided with radial slots, the flights engaging in the radial slots, and the common center of the flights being generally disposed at the level of the periphery of the disc.

2. The program reading mechanism as claimed in claim 1 in which the flights are arranged relative to the disc in such a way that when a change is effected from one flight to the other flight, the one flight engages before the other flight disengages.

3. The program reading mechanism as claimed in claim 1 in which both flights substantially halfway engage in the slots when the program reading mechanism stops.

4. The program reading mechanism as claimed in claim 1 in which the diameter of the disc is greater than the diameter of the transportation roll.

5. The program reading mechanism as claimed in claim 1 including two further flights rotating about the common center rigidly connected to the two flights, and drive elements operably related to the flights and the contacts operative to separate the program carrier from the contacts during the movement of the program carrier.

6. The program reading mechanism as claimed in claim 5 in which the drive elements include a lever provided with a cam portion having an engaging surface, and a resilient element operably related to the lever for urging the engaging surface against said flights.

7. The program reading mechanism as claimed in claim 6 in which the engaging surface is of concave configuration.

8. The program reading mechanism as claimed in claim 5 in which the contacts are scanning pins of a microswitch.

9. The program reading mechanism as claimed in claim 5 in which the drive elements include a guide having a slot disposed perpendicular to the direction of movement of the guide in which slot the program carrier is guided.

10. The program reading mechanism as claimed in claim 1 in which the flights are of a wear resistant plastic.

11. The program reading mechanism as claimed in claim 1 in which the program carrier is an apertured film of plastic.

12. The program reading mechanism as claimed in claim 11 in which two apertures are provided for each data in the program carrier.

13. The program reading mechanism as claimed in claim 12 in which each data has two channels for a control in accord with the two apertures.

14. The program reading mechanism as claimed in claim 11 in which the apertured film has a coordinate system.

15. The program reading mechanism as claimed in claim 1 in which the contacts are ball-shaped and further contacts with which the ball-shaped contacts cooperate at two points.

* * * * *